(12) United States Patent
Suzuki (10) Patent No.: US 8,094,000 B2
(45) Date of Patent: Jan. 10, 2012

(54) SURROUNDINGS MONITORING APPARATUS FOR A MOTOR VEHICLE

(75) Inventor: Koji Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 404 days.

(21) Appl. No.: 12/448,051

(22) PCT Filed: Jan. 3, 2008

(86) PCT No.: PCT/IB2008/000752
§ 371 (c)(1),
(2), (4) Date: Jun. 5, 2009

(87) PCT Pub. No.: WO2008/084408
PCT Pub. Date: Jul. 17, 2008

(65) Prior Publication Data
US 2010/0141413 A1  Jun. 10, 2010

(30) Foreign Application Priority Data
Jan. 9, 2007  (JP) .................................. 2007-001585

(51) Int. Cl.
*B60Q 1/00* (2006.01)
(52) U.S. Cl. .......................... 340/435; 340/436; 342/158
(58) Field of Classification Search .................. 340/435, 340/436, 903; 180/167, 169; 342/158, 90, 342/118, 71, 72; 701/300, 301
See application file for complete search history.

(56) References Cited

U.S. PATENT DOCUMENTS

| 6,265,968 | B1 |   | 7/2001 | Betzitza et al. |
| 6,784,828 | B2 | * | 8/2004 | Delcheccolo et al. ........ 340/436 |
| 6,900,754 | B2 | * | 5/2005 | Ono et al. ..................... 342/158 |
| 7,504,986 | B2 |   | 3/2009 | Brandt et al. |
| 2002/0067287 | A1 |   | 6/2002 | Delcheccolo et al. |
| 2005/0248445 | A1 |   | 11/2005 | Matsuoka |
| 2007/0179712 | A1 |   | 8/2007 | Brandt et al. |

FOREIGN PATENT DOCUMENTS

| EP | 0 936 471 A2 | 8/1999 |
| JP | A-3-282707 | 12/1991 |
| JP | A-2003-185744 | 7/2003 |
| JP | A-2004-359086 | 12/2004 |
| JP | A-2005-032063 | 2/2005 |
| JP | A-2005-182198 | 7/2005 |
| JP | A-2005-271756 | 10/2005 |
| JP | A-2006-088896 | 4/2006 |
| JP | A-2007-533991 | 11/2007 |
| WO | WO 2005/103757 A1 | 11/2005 |
| WO | WO 2006/045649 A1 | 5/2006 |

OTHER PUBLICATIONS

Sep. 1, 2009 Office Action issued in Japanese Patent Application No. 2007-001585 (with translation).

\* cited by examiner

*Primary Examiner* — John A Tweel, Jr.
(74) *Attorney, Agent, or Firm* — Oliff & Berridge, PLC (57) ABSTRACT

In a surroundings monitoring apparatus, a front approaching object detection section detects a front approaching object that is approaching the vehicle from ahead from among objects sensed by a front millimeter wave radar. An object specifying section specifies the object which has been detected as the front approaching object by the front approaching object detection section from among objects sensed by a rear millimeter wave radar. A rear approaching object detection section excludes the object specified by the object specifying section from the objects sensed by the rear millimeter wave radar to detect a rear approaching object that is approaching the vehicle from behind.

6 Claims, 9 Drawing Sheets

SURROUNDINGS MONITORING APPARATUS FOR A MOTOR VEHICLE

BACKGROUND OF THE INVENTION

1. Field of the Invention

The present invention relates to a surroundings monitoring apparatus for monitoring the surroundings of a vehicle.

2. Description of the Related Art

A surroundings monitoring apparatus for monitoring the surroundings of a vehicle is described, for example, in Japanese Patent Application Publication No. 2005-271756 (JP-A-2005-271756). This apparatus monitors the rear of the host vehicle with a rear millimeter wave radar to detect an object approaching the host vehicle from behind, and issues a warning to inform vehicles in the surroundings of the presence of an object that will travel across the rear of the host vehicle. The apparatus thus attempts to avoid a collision between the object and the vehicles in the surroundings.

However, the apparatus of the above related art detects all the objects existing in the rear of the host vehicle, including those moving away from the host vehicle such as a stationary object, in detecting an object approaching the host vehicle from behind. Thus, a considerable time is required before the target object is determined.

SUMMARY OF THE INVENTION

An object of the present invention is to provide a surroundings monitoring apparatus that can improve the speed in detecting an object approaching a vehicle from behind.

A first aspect of the present invention provides a surroundings monitoring apparatus for a vehicle having a front monitoring device for sensing objects existing ahead of the vehicle and a rear monitoring device for sensing objects existing behind the vehicle. The apparatus includes: front approaching object detection means for detecting a front approaching object that is approaching the vehicle from ahead from among the objects sensed by the front monitoring device; object specifying means for specifying the object which has been detected as the front approaching object by the front approaching object detection means from among the objects sensed by the rear monitoring device; and rear approaching object detection means that excludes the specified object from the objects sensed by the rear monitoring device to detect a rear approaching object that is approaching the vehicle from behind.

This surroundings monitoring apparatus can link the information from the front monitoring device and the information from the rear monitoring device to preliminarily exclude the object which has been detected as a front approaching object by the front approaching object detection means from among candidates for a rear approaching object before detecting a rear approaching object from the objects sensed by the rear monitoring device. Therefore, it is possible to reduce the number of candidates, and consequently to improve the speed to detect a rear approaching object.

The object specifying means may include timing calculation means for calculating a timing for the front approaching object sensed by the front monitoring device to start being sensed by the rear monitoring device. With this configuration, it is possible to easily specify the object which starts being sensed by the rear monitoring device at the calculated timing as an object to be excluded from candidates for a rear approaching object.

According to the present invention, it is possible to improve the speed to detect an object that is approaching a vehicle from behind.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

A description will hereinafter be made of an embodiment of the present invention with reference to the accompanying drawings. In the drawings, the same elements are denoted with the same reference numerals, and the description thereof will not be repeated.

Figure 1:
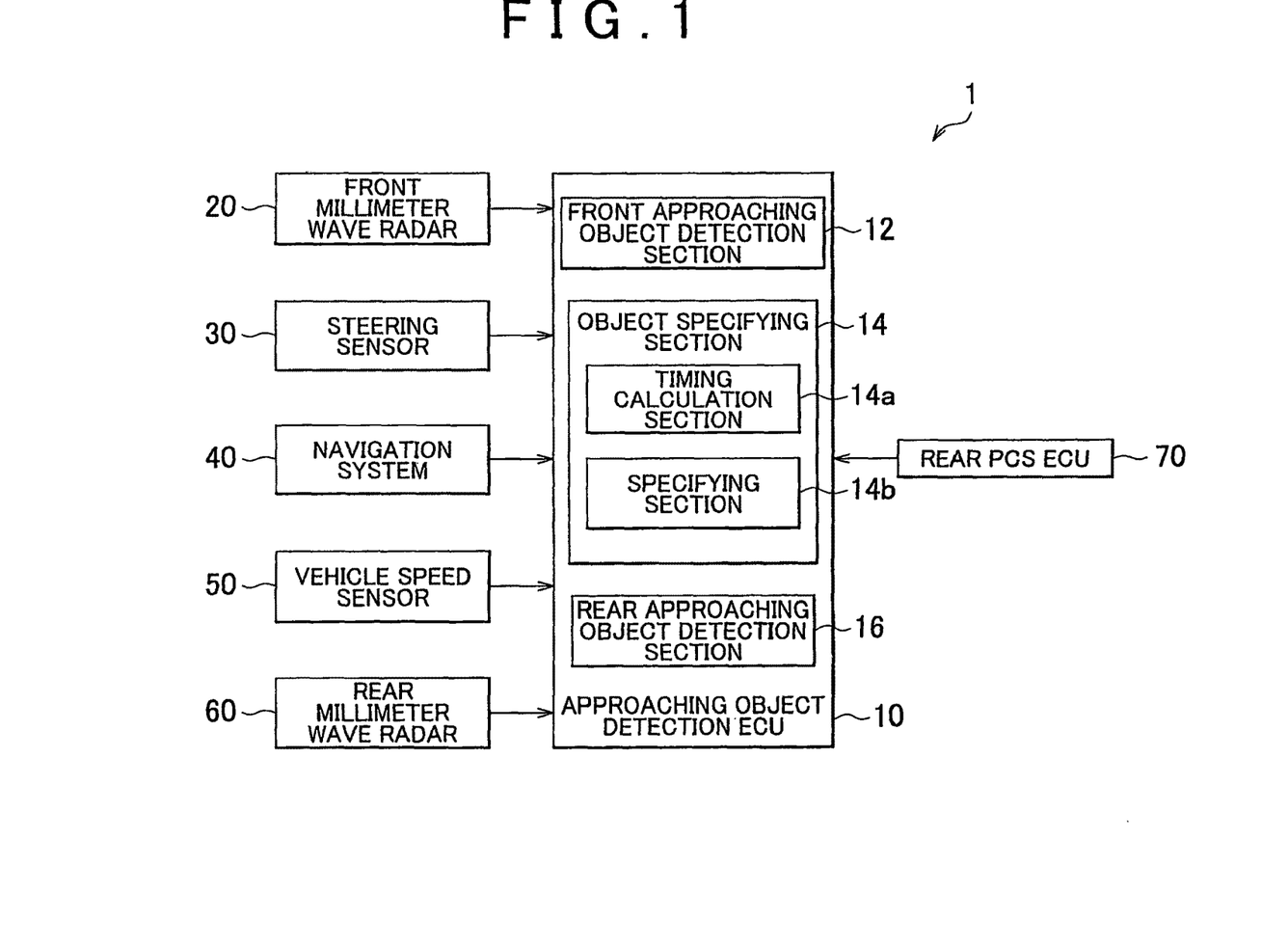
FIG. 1 is a block diagram showing the configuration of a surroundings monitoring apparatus in accordance with this embodiment.

FIG. 1 is a block diagram showing the configuration of a surroundings monitoring apparatus in accordance with this embodiment. As shown in FIG. 1, the surroundings monitoring apparatus 1 includes an approaching object detection electronic control unit (ECU) 10. The approaching object detection ECU 10 is connected with a front millimeter wave radar (front monitoring device) 20, a steering sensor 30, a navigation system 40, a vehicle speed sensor 50, and a rear millimeter wave radar (rear monitoring device) 60 in the input side, and a rear pre-crash safety (PCS) electronic control unit (ECU) 70 in the output side.

The front millimeter wave radar 20 is an FM-CW radar attached at the front of the vehicle to detect an object by emitting a millimeter wave forward and receiving a reflected wave from the object. The steering sensor 30 detects the steering angle according to a steering operation by the driver. The navigation system 40 provides road information including road geometry. The vehicle speed sensor 50 detects the vehicle speed by acquiring a vehicle wheel pulse. The rear millimeter wave radar 60 is an FM-CW radar attached at the rear of the vehicle to detect an object by emitting a millimeter wave rearward and receiving a reflected wave from the object.

The rear PCS ECU 70 controls a pre-crash seatbelt (PSB) system, for example, and activates the PSB system, when the approaching object detection ECU 10 predicts a collision of a vehicle existing behind against the host vehicle, to tighten the seatbelt in preparation for the collision.

The approaching object detection ECU 10 has a front approaching object detection section (front approaching object detection means) 12, an object specifying section (object specifying means) 14, and a rear approaching object detection section (rear approaching object detection means) 16.

The front approaching object detection section 12 detects a front approaching object from among objects existing ahead of the vehicle based on information from the front millimeter wave radar 20. Here, the front approaching object means an object that is approaching the host vehicle from ahead, and includes an object moving closer to the host vehicle and a stationary object sensed by the front millimeter wave radar 20 while the host vehicle is running (such as a guardrail post and a traffic cone on the road, for example). Thus, the front approaching object does not include an object moving away, or a departing object, from the host vehicle as sensed by the front millimeter wave radar 20 while the host vehicle is running, such as a vehicle existing ahead that is accelerating.

The front approaching object detection section 12 calculates the sensing angle, the distance from the host vehicle, the relative speed, and the relative acceleration of the front approaching object based on the information from the front millimeter wave radar 20.

The rear approaching object detection section 16 detects a rear approaching object from among objects existing behind the vehicle based on information from the rear millimeter wave radar 60. Here, the rear approaching object means an object that is approaching the host vehicle from behind, and includes an object moving closer to the host vehicle, such as a vehicle existing behind that is accelerating. Thus, the rear approaching object does not include an object moving away, or a departing object, from the host vehicle as sensed by the rear millimeter wave radar 60 while the host vehicle is running, whether moving or stationary.

Figure 8:
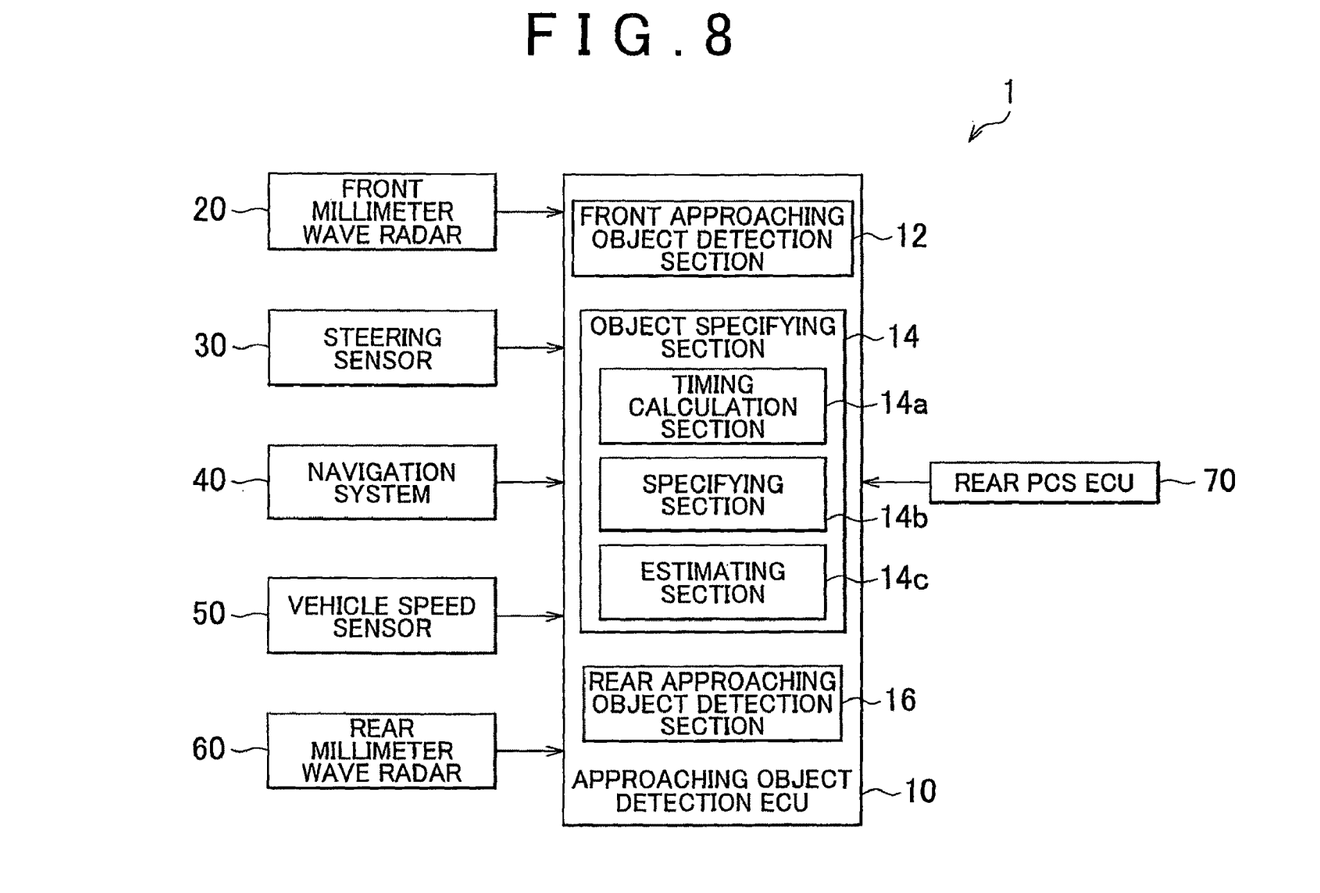
FIG. 8 is a block diagram showing the configuration of a surroundings monitoring apparatus in accordance with a modification of this embodiment.

The object specifying section 14 specifies the object which has been sensed as a front approaching object by the front millimeter wave radar 20 from among the objects sensed by the rear millimeter wave radar 60. The object specifying section 14 has a timing calculation section (timing calculation means) 14a and a specifying section 14b. The object specifying section 14 may further have an estimating section 14c, as shown in FIG. 8.

The timing calculation section 14a estimates the curvature radius R of a curve of the road ahead of the vehicle based on information from the steering sensor 30 and/or the navigation system 40 (this curvature radius R is referred to as "curve estimated R"). In addition, the timing calculation section 14a may calculate the curvature radius R of a curve of the road ahead of the vehicle based on the reflected wave information on a roadside object existing ahead from the front millimeter wave radar 20 (this curvature radius R is referred to as "road geometry estimated R" for differentiation from the "curve estimated R"). Then, based on the curve estimated R, and the sensing angle, the distance, and the relative speed of a front stationary object sensed by the front millimeter wave radar 20, the timing calculation section 14a computes the timing for the front stationary object detected by the front approaching object detection section 12 to start being sensed by the rear millimeter wave radar 60.

Figure 2:
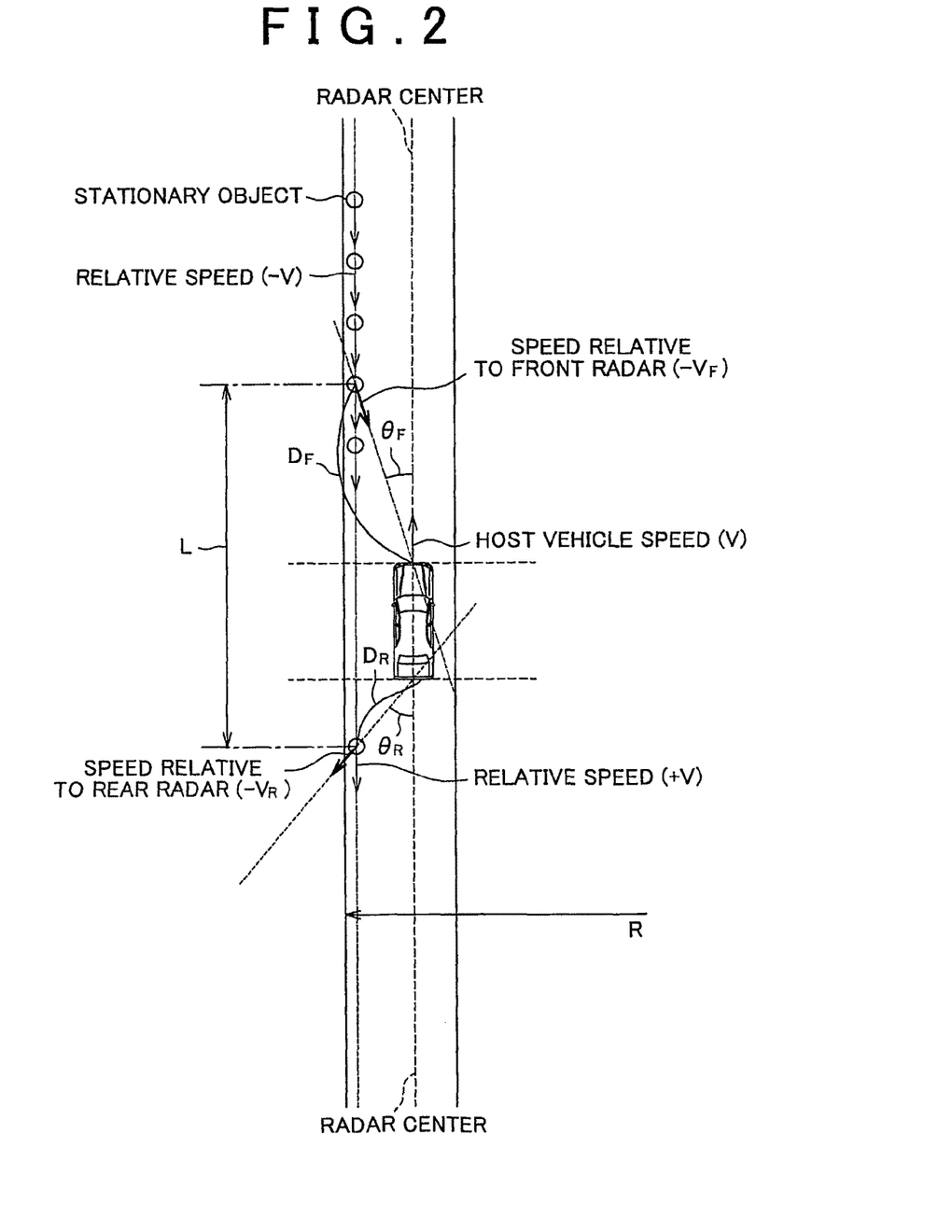
FIG. 2 is a diagram showing the relationship of a host vehicle running along a straight road, a roadside object, and the sensing ranges of a front millimeter wave radar and a rear millimeter wave radar.

With reference to FIG. 2, the sensing angle $\theta_F$, the distance $D_F$, and the relative speed ($-V_F$) of a front stationary object can be obtained by the front millimeter wave radar 20. The curve estimated R can also be obtained by the steering sensor 30 and/or the car navigation system 40. In addition, the viewing angle $\theta_R$ of the rear millimeter wave radar 60 is known. Thus, it is possible to calculate the apparent distance L of movement to be made by the front stationary object sensed by the front millimeter wave radar 20 before it starts being sensed by the rear millimeter wave radar 60. Since the vehicle speed V of the host vehicle is available, the time T for the front stationary object, of the front approaching objects sensed by the front millimeter wave radar 20, to start being sensed by the rear millimeter wave radar 60 can be calculated as L/V.

Figure 3:
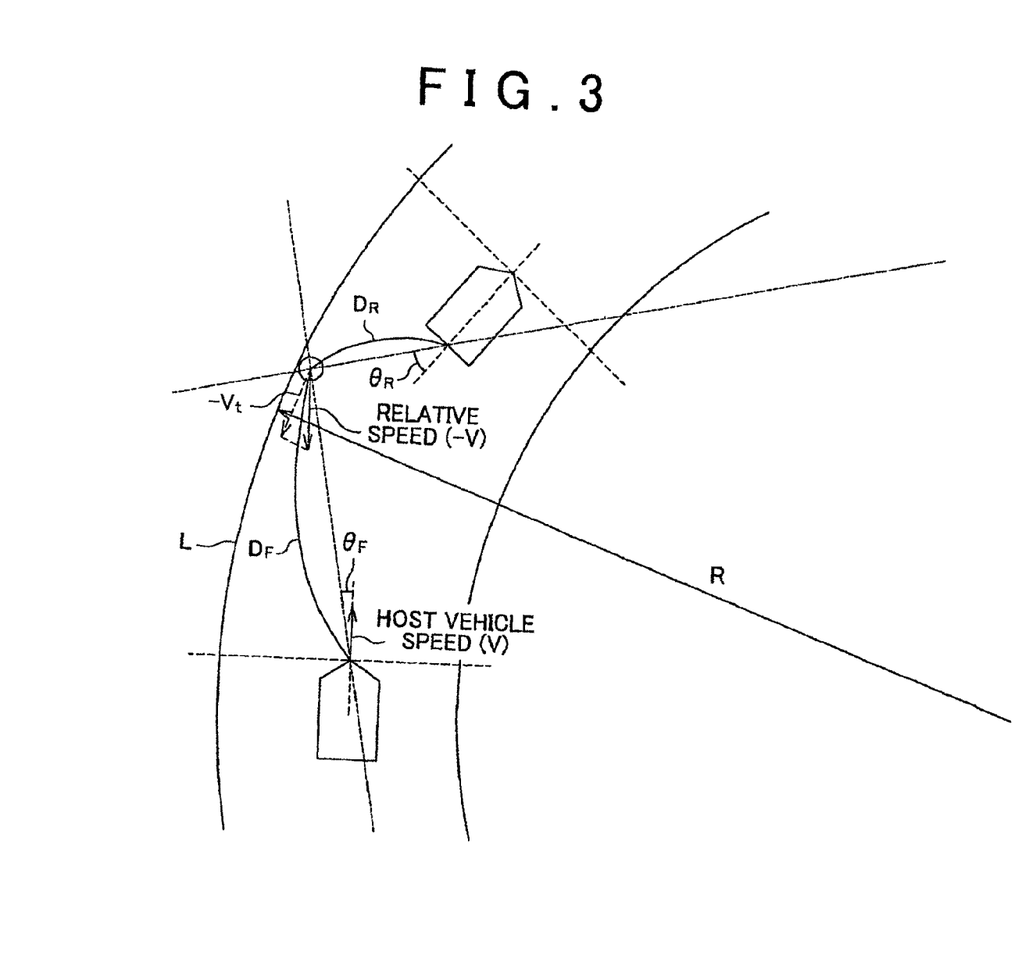
FIG. 3 is a diagram showing the relationship of the host vehicle running along a curve, a roadside object, and the sensing ranges of the front millimeter wave radar and the rear millimeter wave radar.

In the case of FIG. 2, the curve estimated R is infinite and the lane extends straight. However, also in the case of FIG. 3 where the lane is curved, the moving distance L can be calculated from the apparent track of movement to be made by the front approaching object before it is sensed by the rear millimeter wave radar 60, utilizing the curve estimated R. Therefore, the time T for the front stationary object, of the front approaching objects sensed by the front millimeter wave radar 20, to start being sensed by the rear millimeter wave radar 60 can be calculated as $L/V_t$, where $V_t$ is the tangential component of the relative speed V. In this case, the relative speed of the front approaching object has been multiplied by (−1).

In addition, based on the curve estimated R, and the angle, the distance, the relative speed, and the relative acceleration of a front approaching moving object, of the front approaching objects sensed by the front millimeter wave radar 20, the timing calculation section 14a computes the timing for the front approaching moving object detected by the front approaching object detection section 12 to start being sensed by the rear millimeter wave radar 60. In the case of a front approaching moving object, the timing should be computed in consideration of the relative acceleration as well, unlike in the case of a stationary object.

In the case where the road geometry estimated R has been calculated, the road geometry estimated R is used in place of the curve estimated R to calculate the time T for a front stationary object and a front approaching moving object to start being sensed by the rear millimeter wave radar 60 in the same way as described above.

Here, the object specifying section 14 may have an estimating section 14c (FIG. 8) for estimating the distance $D_R$, the angle $\theta_R$, and the relative speed $V_R$ with respect to a front approaching object detected by the front approaching object detection section 12 at the timing for the object to start being sensed by the rear millimeter wave radar 60. In this case, these values are estimated considering that the curve estimated R of the host vehicle has been multiplied by (−1) in the rear millimeter wave radar 60.

The specifying section 14b specifies the object which has been sensed as a front approaching object by the front millimeter wave radar 20 from among the objects sensed by the rear millimeter wave radar 60 based on the information from the rear millimeter wave radar 60 and the timing information calculated by the timing calculation section 14a. An object which has been sensed as a front approaching object moves rearward relative to, and then away from, the host vehicle as the host vehicle runs. Thus, since information on a front approaching object is not necessary in sensing a rear approaching object, a front approaching object is immediately excluded from candidates for a rear approaching object. This exclusion is described with reference to FIGS. 4 and 5.

Figure 4A:
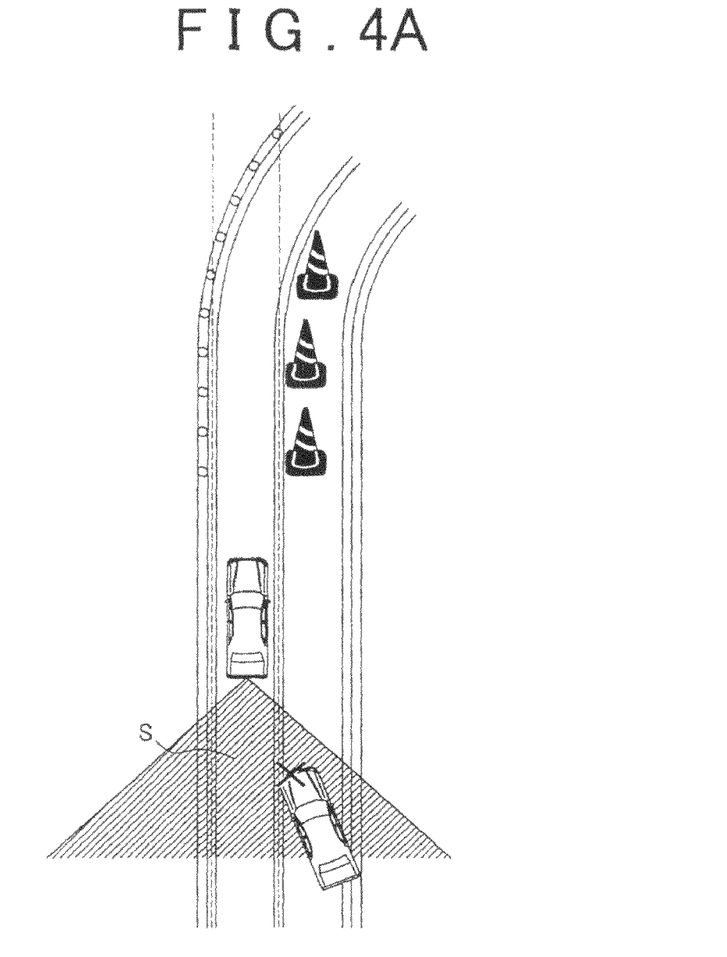
FIGS. 4A and 4B are respectively a diagram showing the state where the rear millimeter wave radar is sensing a rear approaching vehicle that is approaching from behind, and a chart showing frequency peaks of a received wave.
Figure 4B:
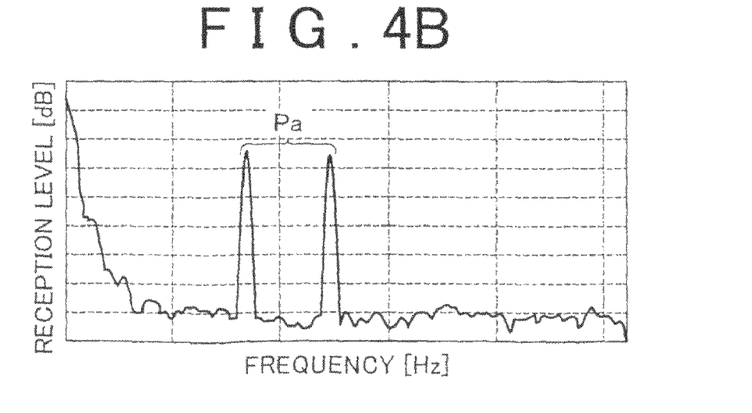
Figure 5A:
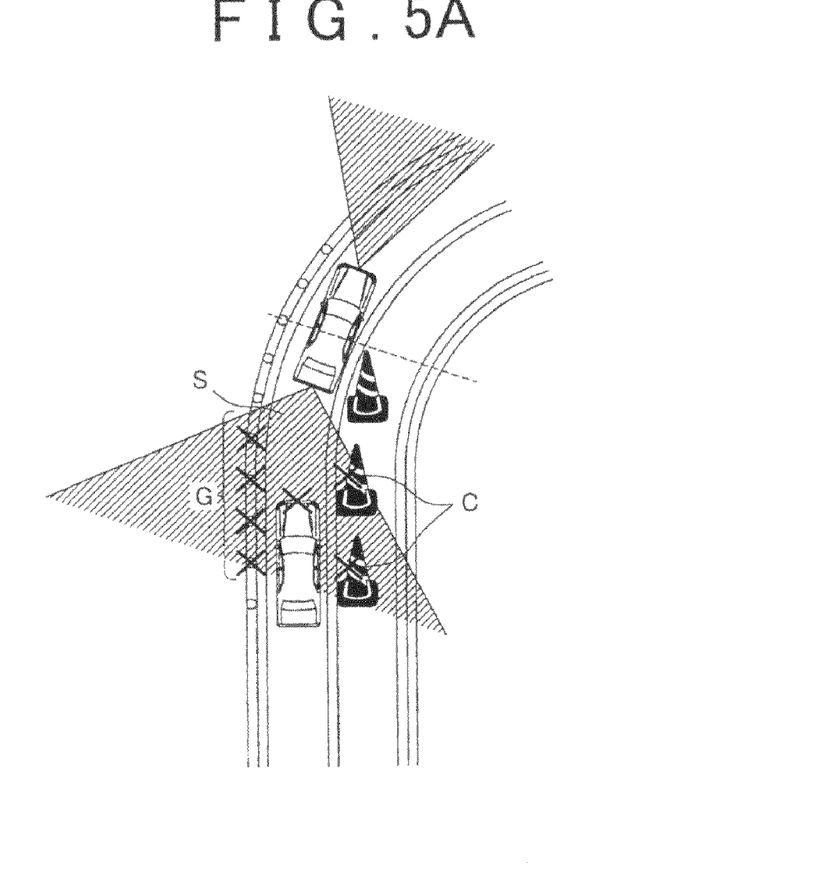
FIGS. 5A and 5B are respectively a diagram showing the state where the rear millimeter wave radar is sensing a rear approaching vehicle and a rear departing object that is moving away in the rear, and a chart showing frequency peaks of a received wave.
Figure 5B:
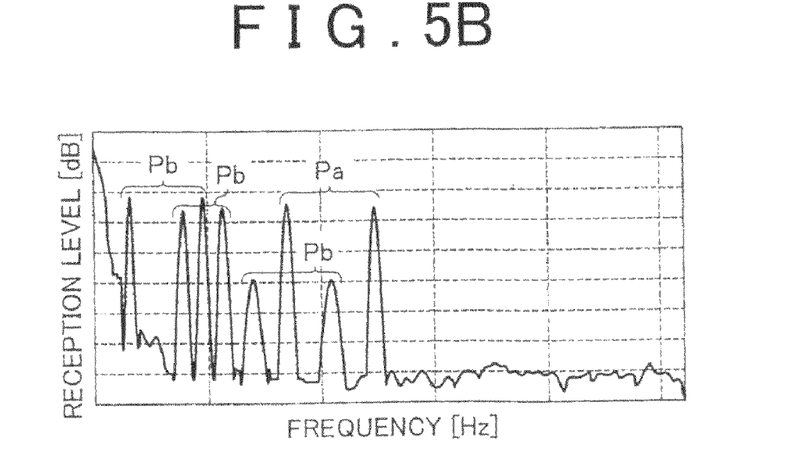

In the case where there is no rear departing object such as a guardrail post in the sensing range S of the rear millimeter wave radar 60 as shown in FIG. 4, frequency peaks $P_a$ during ascent and descent can be specified and paired with each other when a rear approaching vehicle comes in the sensing range S. As a result, the rear approaching vehicle can be detected easily. In the case where a stationary object such as a roadside object G and a cone C exists in the sensing range S of the rear millimeter wave radar 60 as shown in FIG. 5, however, frequency peaks $P_a$ of a rear approaching vehicle are buried among a plurality of peaks $P_b$ of such a stationary object. As a result, detection of the peaks of the rear approaching vehicle may be delayed, or one of the peaks may not be detected so that the pairing cannot be performed. In particular, since the sensing range of the rear millimeter wave radar 60 is wider than that of the front millimeter wave radar 20, the rear millimeter wave radar 60 is susceptible to the influence of reflection from a stationary object such as a roadside object. Further, in the case where the radar center axis is not in parallel to the traveling direction of the host vehicle, there is a higher possibility that a stationary object such as a roadside object, rather than a rear approaching object to be detected, exists on the radar center axis, where the reception level of the radar is highest. Therefore, it is more likely that the peak detection may be delayed or that mispairing may occur.

Figure 6:
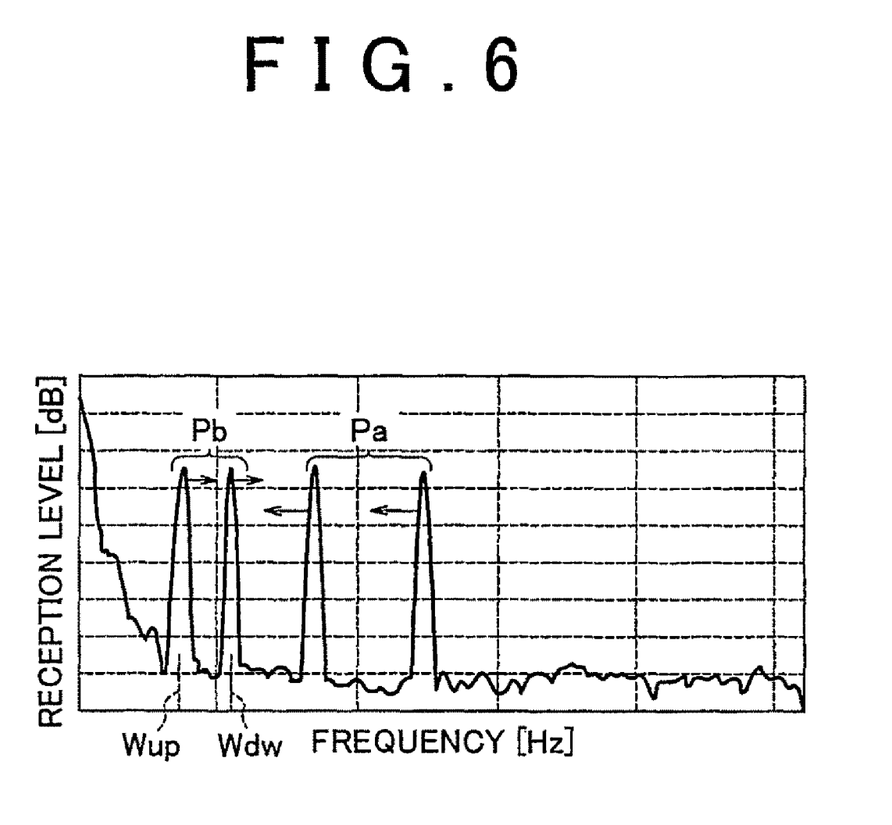
FIG. 6 is a chart showing frequency peaks of a received wave due to a rear approaching object and a rear departing object.

In view of the above, the surroundings monitoring apparatus 1 in accordance with this embodiment preliminarily calculates the timing for a front approaching object such as a front stationary object and a front approaching moving object to come into the sensing range S of the rear millimeter wave radar 60 since it inevitably will, and specifies the frequency peaks due to the front approaching object contained in the frequency peak information from the rear millimeter wave radar 60, to exclude the object with the specified peaks from candidates from which a rear approaching object is to be detected. Since the timing calculation section 14a has calculated the timing for a front approaching object to start being sensed by the rear millimeter wave radar 60, the frequency peaks $P_b$ that appear at the calculated timing while monitoring the frequency peaks from the rear millimeter wave radar 60 are specified as the peaks due to the front approaching object, as shown in FIG. 6. Since a rear departing object sensed by the rear millimeter wave radar 60 (which has been sensed as a front approaching object) moves away from the host vehicle at the relative speed $V_R$, the frequency peaks $P_b$ due to the rear departing object move to the right at a rate in accordance with the relative speed $V_R$ in the graph of FIG. 6, and therefore can be tracked easily. The frequency peaks due to a rear approaching object move to the left in the graph of FIG. 6.

Here, in the case where the estimating section 14c shown in FIG. 8 has estimated the distance $D_R$, the angle $\theta_R$, and the relative speed $V_R$ at the timing for a front approaching object detected by the front approaching object detection section 12 to start being sensed by the rear millimeter wave radar 60, a rear departing object (which has been sensed as a front approaching object) can be specified more quickly and accurately.

That is, when the distance $D_R$ and the relative speed $V_R$ of an object sensed by the rear millimeter wave radar 60 are known, the peak frequencies of a reflected wave from the object during ascent and descent, namely ascent frequency $W_{up}$ and descent frequency $W_{dw}$, respectively, can be calculated by the following expressions (1) and (2):

$$D_R \propto (W_{up} + W_{dw})/2 \quad (1)$$

$$V_R \propto (W_{dw} - W_{up})/2 \quad (2)$$

When the ascent frequency $W_{up}$ and the descent frequency $W_{dw}$, are calculated in this way, not only the timing of the peaks but also the location can be known as shown in FIG. 6. For example, a rear departing object (which has been sensed as a front approaching object) can be specified more quickly and accurately with only the frequency peak during descent $W_{dw}$ which appears earlier. In the case where the angle $\theta_R$ has been estimated, a rear departing object can be specified more accurately.

The rear approaching object detection section 16 excludes the object specified by the object specifying section 14 from the objects sensed by the rear millimeter wave radar 60, or candidate for a rear approaching object, based on the information from the rear millimeter wave radar 60 and the information from the object specifying section 14, to detect a rear approaching object. A rear approaching object is specified according to the sensing angle, the distance from the host vehicle, the relative speed, and the relative acceleration.

A description will now be made of a method to detect a rear approaching object to be performed by the surroundings monitoring apparatus 1 described above with reference to the flowchart of FIGS. 7A, 7B. The process described below is repeated at predetermined intervals after turning on the ignition.

Figure 7A:
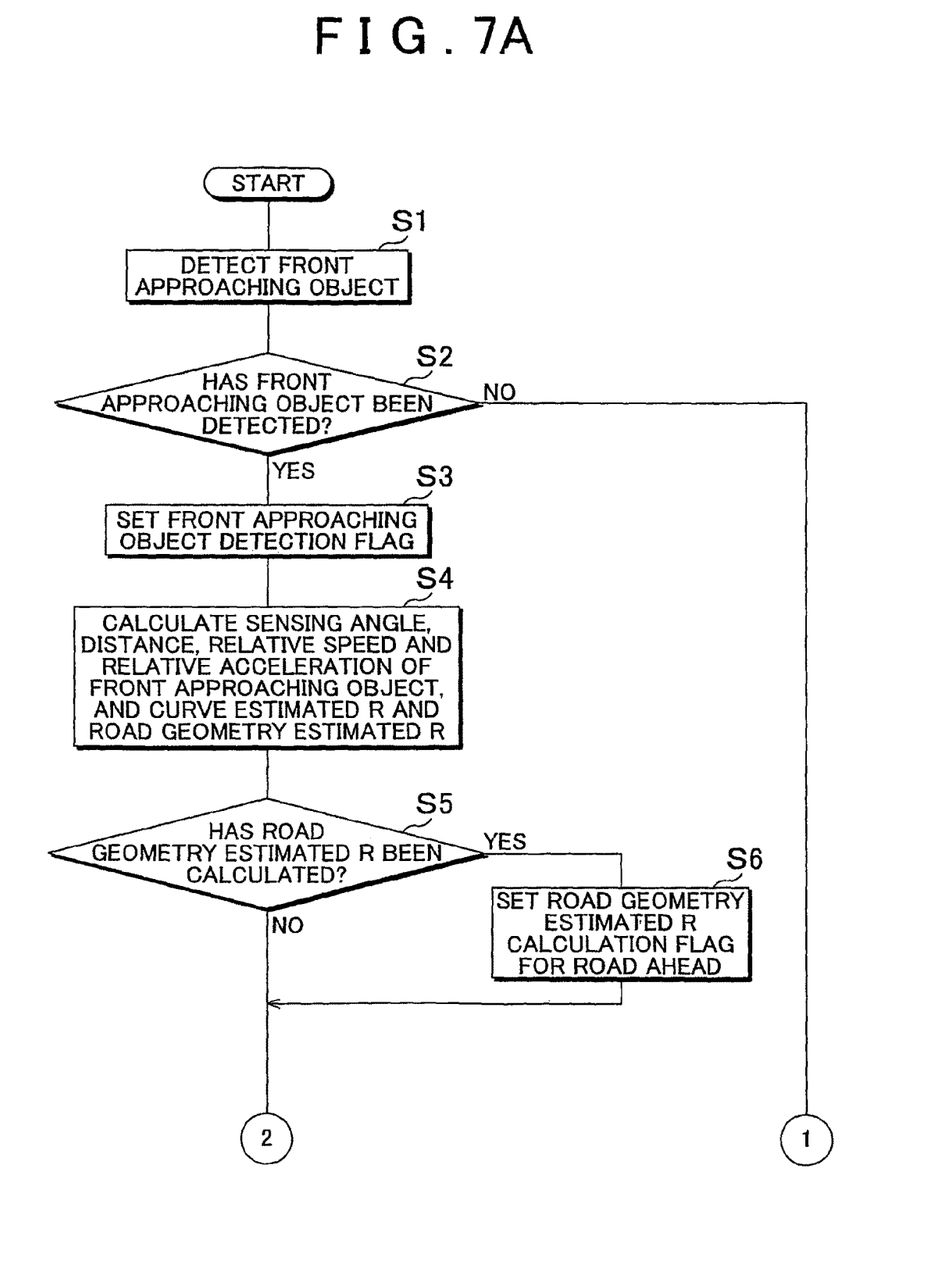
FIGS. 7A, 7B are a flowchart showing a method to detect a rear approaching object performed by the surroundings monitoring apparatus in accordance with this embodiment.
Figure 7B:
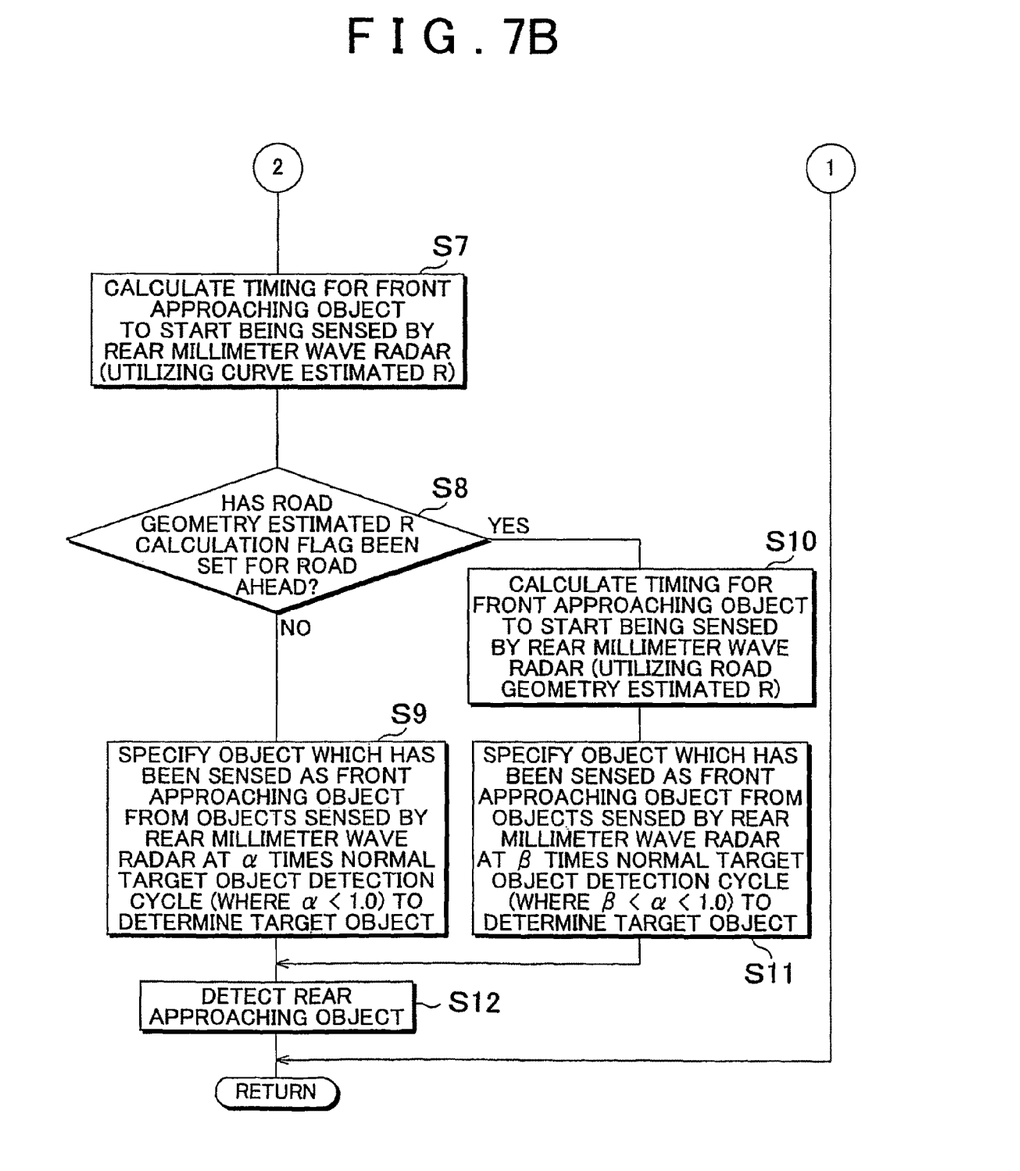

First, the front millimeter wave radar 20 senses objects existing ahead of the vehicle, and the front approaching object detection section 12 detects a front approaching object that is approaching the host vehicle from ahead (step S1). Then, it is determined whether or not a front approaching object has been detected (step S2). If no front approaching object has been detected, the process is terminated. On the other hand, if a front approaching object has been detected, a front approaching object detection flag is set (step S3), and then the process proceeds to step S4.

In step S4, the timing calculation section 14a calculates the sensing angle, the distance, the relative speed, and the relative acceleration of the front approaching object based on the information from the front millimeter wave radar 20. In addition, the timing calculation section 14a calculates the curve estimated R of the road ahead of the vehicle based on the information from the steering sensor 30 and/or the navigation system 40. Further, the timing calculation section 14a calculates the road geometry estimated R of a curve of the road ahead of the vehicle based on the reflected wave information on a roadside object existing ahead from the front millimeter wave radar 20.

Then, in step S5, it is determined whether or not the road geometry estimated R has been calculated. If it has been calculated, a road geometry estimated R calculation flag is set (step S6), and then the process proceeds to step S7. On the other hand, if the road geometry estimated R has not been calculated, the process proceeds to step S7 without setting the flag.

In step S7, based on the curve estimated R, and the sensing angle, the distance, and the relative speed of a front stationary object sensed by the front millimeter wave radar 20, the timing calculation section 14a computes the timing for the front stationary object detected by the front approaching object detection section 12 to start being sensed by the rear millimeter wave radar 60. Alternatively, based on the curve estimated R, and the sensing angle, the distance, the relative speed, and the relative acceleration of a front approaching moving object sensed by the front millimeter wave radar 20, the timing calculation section 14a computes the timing for the front approaching moving object detected by the front approaching object detection section 12 to start being sensed by the rear millimeter wave radar 60.

At this time, the estimating section 14c of the object specifying section 14 may estimate through computation the distance $D_R$, the angle $\theta_R$, and the relative speed $V_R$ at the timing for the front approaching object detected by the front approaching object detection section 12 to start being sensed by the rear millimeter wave radar 60.

Then, it is determined whether or not the road geometry estimated R calculation flag has been set for the road ahead (step S8). If the flag has not been set, the process proceeds step S9. In step S9, the object which has been sensed as a front approaching object is specified from among the objects sensed by the rear millimeter wave radar 60 at a tracking cycle ($Q \times \alpha$, where $0 < \alpha < 1.0$), which is shorter than the normal target object detection cycle Q, to determine the target object. At this time, the target object may be specified based solely on the timing for the front approaching object to start being sensed by the rear millimeter wave radar 60, or may be specified additionally based on the peak frequencies and the angle $\theta_R$ at the timing calculated from the distance $D_R$ and the relative speed $V_R$. After determining the target object, the frequency peaks $P_b$ due to the target object move to the right at a rate in accordance with the relative speed $V_R$, and therefore can be tracked easily.

On the other hand, if the front road geometry estimated R calculation flag has been set for the road ahead, the process proceeds to step S10. In step S10, based on the road geometry estimated R, in place of the curve estimated R, and the sensing angle, the distance, and the relative speed of a front stationary object sensed by the front millimeter wave radar 20, the timing calculation section 14a computes the timing for the front stationary object detected by the front approaching object detection section 12 to start being sensed by the rear millimeter wave radar 60, and performs a correction. Alternatively, based on the road geometry estimated R, in place of the curve estimated R, and the sensing angle, the distance, the relative speed, and the relative acceleration of a front approaching moving object sensed by the front millimeter wave radar 20, the timing calculation section 14a computes the timing for the front approaching moving object detected by the front approaching object detection section 12 to start being sensed by the rear millimeter wave radar 60, and performs a correction. Then, the process proceeds to step S11. In step S11, the object which has been sensed as a front approaching object is specified from among the objects sensed by the rear millimeter wave radar 60 at a tracking cycle ($Q \times \beta$, where $0 < \beta < \alpha < 1.0$), which is further shorter than the cycle ($Q \times \alpha$) used in step S9, to determine the target object. At this time, the target object may be specified based solely on the corrected timing, or may be specified additionally based on the peak frequencies and the angle $\theta_R$ at the corrected timing calculated from the corrected distance $D_R$ and the corrected relative speed $V_R$. After determining the target object, the frequency peaks $P_b$ due to the target object move to the right at a rate in accordance with the relative speed $V_R$, and therefore can be tracked easily.

After specifying the object which has been sensed as a front approaching object from among the objects sensed by the rear millimeter wave radar 60, in step S12, the rear approaching object detection section 16 detects a rear approaching object that is approaching the host vehicle from behind. At this time, since the object which has been sensed as a front approaching object such as a roadside object has been specified by the specifying section 14b, the specified object is excluded from the objects sensed by the rear millimeter wave radar 60, or candidate for a rear approaching object, to detect a rear approaching object. When a collision of a vehicle existing behind against the host vehicle is predicted, a signal is sent to the rear PCS ECU 70 to activate the PSB system to tighten the seatbelt in preparation for the collision.

As described above, the surroundings monitoring apparatus 1 in accordance with this embodiment can link the information from the front millimeter wave radar 20 and the information from the rear millimeter wave radar 60 to preliminarily exclude the object which has been detected as a front approaching object by the front approaching object detection section 12 from among candidates for a rear approaching object before detecting a rear approaching object from among the objects sensed by the rear millimeter wave radar 60. Thus, it is possible to improve the speed to detect a rear approaching object by reducing the number of candidates.

The timing calculation section 14a can calculate the timing for a front approaching object sensed by the front millimeter wave radar 20 to start being detected by the rear millimeter wave radar 60, and the specifying section 14b can easily specify the object which starts being sensed by the rear millimeter wave radar 60 at the calculated timing as an object to be excluded from candidates for a rear approaching object. That is, by monitoring frequency peaks of a reflected wave received by the rear millimeter wave radar 60, it is possible to easily specify an object corresponding to the peaks that appear at the calculated timing as the front approaching object which has been sensed by the front millimeter wave radar 20, and to exclude the specified object from candidates for a rear approaching object.

In the case where the road geometry estimated R has been calculated, the road geometry estimated R is utilized to calculate the timing for a rear departing object (which has been sensed as a front approaching object) to start being sensed by the rear millimeter wave radar 60, to correct the timing calculated based on the road geometry estimated R. Then, a rear departing object can be specified based on the corrected timing to be excluded from candidates for a rear approaching object. In this way, the timing for a rear departing object to start being detected can be calculated utilizing a more accurate curvature radius R, in other words, utilizing the road geometry estimated R obtained by the front millimeter wave radar 20, which is more accurate than the curve estimated R based on the steering angle of the steering wheel having a play and the curve estimated R based on the information from the navigation system 40. As a result, it is possible to specify a rear departing object more accurately, and to determine the target object more quickly.

That is, although the timing for a rear departing object to start being detected, and the distance, the angle and the relative speed at that timing can be estimated utilizing the curve estimated R based on the host vehicle information such as the steering angle of the steering wheel and the curve estimated R based on the information from the navigation system 40, such estimated values are no more than predictions. By utilizing the road geometry estimated R which is more accurate, it is possible to improve the reliability of and sufficiently shorten the cycle to determine the target object.

A stationary object and an approaching moving object temporarily existing on the road cannot be recognized with only the navigation information and the host vehicle information. Utilizing such information and the information from the front millimeter wave radar 20 in combination, however, the rear millimeter wave radar 60 can detect a rear departing object with greatly improved precision compared to the case where only the navigation information, for example, is utilized.

By specifying a rear departing object based on not only the timing for the rear departing object to start being detected but also the peak frequencies and the angle $\theta_R$ at that timing calculated from the distance $D_R$ and the relative speed $V_R$ of the rear departing object at that timing, it is possible to specify the target object more accurately and quickly.

Since a rear departing object can be specified as the target object immediately and accurately to be excluded from candidates for a rear approaching object, it is possible to avoid mispairing of peaks of a reflected wave due to the rear approaching object, and to shorten the cycle to determine the target object.

The present invention is not limited to the above embodiment, and may be modified in various ways. For example, although the rear PCS ECU 70 is connected to the output side of the approaching object detection ECU 10 in the above embodiment, ECUs of various systems may be connected thereto, such as systems for ACC (adaptive cruise control), stop and go control for use in traffic jams, obstruction warning, and intervening brake control, to utilize information on a rear approaching object in these systems.

The invention claimed is:

1. A surroundings monitoring apparatus for a vehicle having a front monitoring device for sensing objects existing ahead of the vehicle and a rear monitoring device for sensing objects existing behind the vehicle, characterized by comprising:
   a front approaching object detection section that detects a front approaching object that is approaching the vehicle from ahead from among the objects sensed by the front monitoring device;
   an object specifying section that specifies the object which has been detected as the front approaching object by the front approaching object detection section from among the objects sensed by the rear monitoring device; and
   a rear approaching object detection section that excludes the specified object from the objects sensed by the rear monitoring device to detect a rear approaching object that is approaching the vehicle from behind.

2. The surroundings monitoring apparatus according to claim 1, wherein
   the object specifying section includes a timing calculation section that calculates a timing for the front approaching object sensed by the front monitoring device to start being sensed by the rear monitoring device.

3. The surroundings monitoring apparatus according to claim 2, wherein
   the object specifying section includes a specifying section that specifies the front approaching object detected by the front approaching object detection section from among the objects sensed by the rear monitoring device based on information from the rear monitoring device and the timing calculated by the timing calculation section.

4. The surroundings monitoring apparatus according to claim 3, wherein
   the object specifying section includes an estimating section that estimates a distance from the vehicle to the object, an angle of the vehicle with respect to the object, and a relative speed between the vehicle and the object at the timing for the front approaching object detected by the front approaching object detection section to start being detected by the rear monitoring device.

5. A surroundings monitoring method for a vehicle having a front monitoring device for sensing objects existing ahead of the vehicle and a rear monitoring device for sensing objects existing behind the vehicle, characterized by comprising the steps of:
   detecting a front approaching object that is approaching the vehicle from ahead;
   specifying the object which has been detected as the front approaching object from among the objects sensed by the rear monitoring device;
   excluding the specified object from the objects sensed by the rear monitoring device; and
   detecting a rear approaching object that is approaching the vehicle from behind.

6. The surroundings monitoring method according to claim 5, further comprising the step of:
   calculating a timing for the detected front approaching object to start being sensed by the rear monitoring device.

* * * * *